United States Patent

Gubelmann

[15] 3,688,365

[45] Sept. 5, 1972

[54] INFEED RACK CUTTER FOR CUTTING GEAR TEETH IN A WORKPIECE

[72] Inventor: Walter Gubelmann, Zurich, Switzerland

[73] Assignee: Maag Gear Wheel & Machine Company Limited, Zurich, Switzerland

[22] Filed: Oct. 7, 1970

[21] Appl. No.: 78,694

[30] Foreign Application Priority Data

Oct. 9, 1969 Switzerland............15154/69

[52] U.S. Cl..................................................29/95
[51] Int. Cl. ................................................B26d 1/00
[58] Field of Search.........29/95, 97, 105, 105.1, 103, 29/103.3, 103.2, 95.1

[56] References Cited

UNITED STATES PATENTS

| 1,512,543 | 10/1924 | Jury..............................29/95 |
|---|---|---|
| 401,987 | 4/1889 | Waterman..............29/95.1 X |
| 2,029,399 | 2/1936 | Try............................29/103.3 |
| 2,267,181 | 12/1941 | Wildhaber..................29/105 |
| 1,677,815 | | Crott..........................29/95.1 |
| 2,271,781 | 2/1942 | Slayton........................29/105 |
| 2,321,765 | 6/1943 | Moyer............................29/97 |

Primary Examiner—Harrison L. Hinson
Attorney—McGlew and Toren

[57] ABSTRACT

In an infeed rack cutter for cutting gear teeth in a workpiece, and provided with teeth which differ from each other and for generating premachined tooth gaps, the tool tooth at one end of the rack, intended for the first engagement with the workpiece, has a maximum tooth root thickness and a minimum tooth height, each successive tool tooth having a smaller root thickness and a larger tooth height than the receding tooth, so that the tool tooth at the other end of the rack, intended for the last engagement with the workpiece, has the smallest root thickness and the largest tooth height.

2 Claims, 2 Drawing Figures

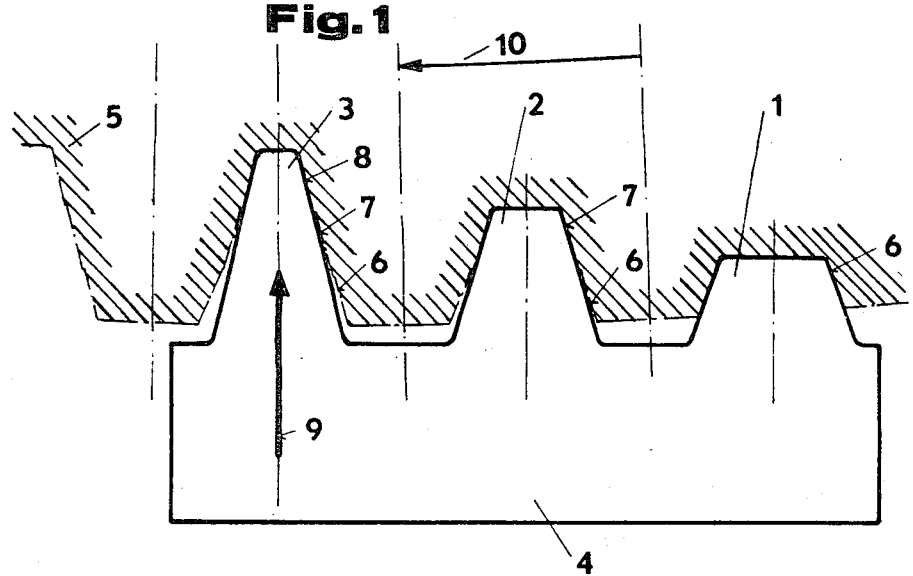
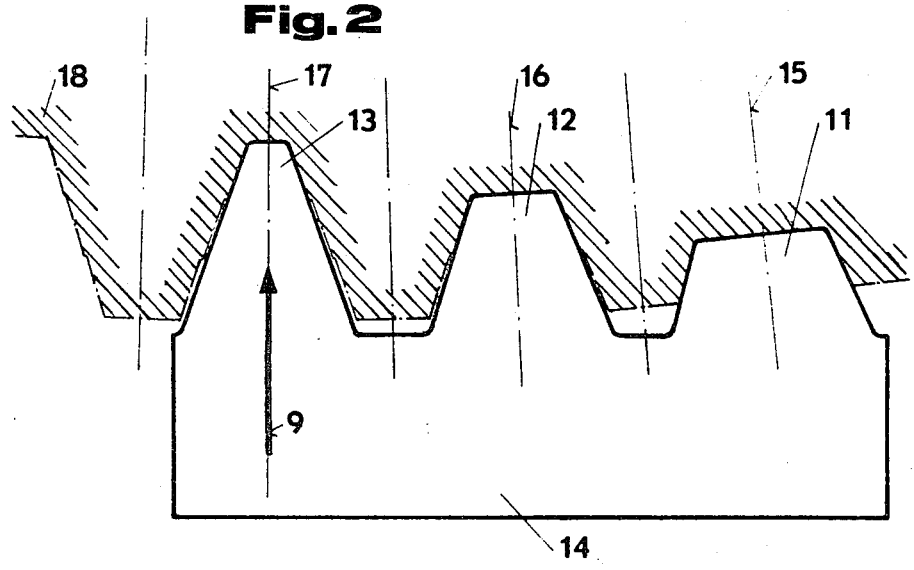

INFEED RACK CUTTER FOR CUTTING GEAR TEETH IN A WORKPIECE

This invention relates to an infeed rack cutter, for cutting gear teeth in a workpiece, with teeth differing from each other and provided for the production of premachined tooth gaps.

The prior art already discloses gear generating tools, particularly in the form of face cutter heads, with serially disposed individual tool teeth for the production of bevel gears, the shape of the individual tool teeth differing from each other in order to subdivide the swarf or chip. Teeth whose shape differs from each other are also known in generating cutters for the production of spur gears in order to subdivide the swarf or chip, for example where the tip edge of the tool tooth is inclined alternately to the right and left respectively so that for each tooth only one flank cutting edge comes into action next to the tip cutting edge.

The cutting edges of rack cutters cannot be readily disposed serially in the cutting direction for reasons of space, and also because such procedure would necessitate longer strokes of the tool. However, subdivision of the swarf or chip is very important in the case of very large modules, particularly in rough-machining were a large proportion of the tooth gap stock must be removed and where the accuracy of the profile is not yet important.

It is the object of the invention to provide an infeed rack cutter in which the overall performance of the tool is substantially uniformly divided over its teeth and in which the individual cutting edge lengths are shortened even in the case of deep cuts and at the same time reduce the three-sided cutting of a tool tooth.

According to the invention this is achieved in that the tool tooth at one end of the rack, intended for the first engagement with the workpiece, has a maximum tooth root thickness and a minimum tooth height, each successive tool tooth having a smaller root thickness and a larger tooth height than the preceding tooth, so that the tool tooth at the other end of the rack, intended for the last engagement with the workpiece, has the smallest root thickness and the largest tooth height.

This system also prolongs the working life for any given infeed operation and/or substantially increases the stock removal rate.

The accompanying drawings show, in diagrammatic form, embodiments of infeed rack cutters according to the invention:

FIG. 1 is a plan view of one embodiment; and
FIG. 2 is a plan view of another embodiment.

In FIG. 1, the tool teeth 1, 2 and 3 of a rack cutter 4 of a gear generating machine for machining a cylindrical spur gear 5 have different tooth thicknesses and tooth heights. The tooth 1 has the largest tooth thickness, the next adjacent tooth 2 has a smaller tooth thickness, and the third tooth 3 has the smallest tooth thickness. The tooth height of the tool teeth 1, 2 and 3 also differ from each other, in that the tooth 1 having the smallest height, the next adjacent tooth 2 has a larger height and the third tooth 3 has the largest tooth height. The first tooth gap 6 machined by the tool tooth 1 moves after the first machining, into the position of the tooth 2 which then generates the tooth gap 7 and, after the second machining of this tooth gap it moves into the position of the tooth 3 which generates the tooth gap 8. During each machining operation the rack cutter advances in the direction of the arrow 9. The gear wheel 5 is indexed by one tooth division in the direction of the arrow 10 each time the rack cutter 4 is retracted in the direction opposed to the arrow 9.

In FIG. 1 the lines of symmetry of the tool teeth 1, 2, and 3 are parallel to each other, and the figure shows that each tool tooth itself feeds only into a limited and approximately identical depth so that the cutting performance or cutting depth is divided over the different tool teeth and the cutting edge lengths of the individual tool teeth is substantially limited by comparison with a tool tooth which must accomplish the full depth of cutting in one infeed operation.

In the form shown in FIG. 2, the lines of symmetry 15, 16 and 17 of the tool teeth 11, 12 and 13 of the rack cutter 14 are not disposed in parallel to each other, but they are orientated relative to the center of the gear wheel 18. This is of advantage, in particular when machining workpieces with a small number of teeth, since the premachined tooth gaps will always be orientated relative to the wheel center even if the feed motion of the rack cutter 14 is in the direction of the arrow 9.

The infeed rack cutter provided with tool teeth according to this invention and as hereinbefore described is suitable for a defined range of the number of teeth in the workpiece.

I claim:

1. In an infeed rack cutter for cutting gear teeth in a workpiece, and provided with teeth which differ from each other for generating premachined tooth gaps, said rack having a first end intended for first engagement with said workpiece and an end opposite said first end intended for last engagement with said workpiece, the improvement wherein the tool tooth at said first end of the rack intended for first engagement with the workpiece has a maximum tooth root thickness and a minimum tooth height, with each successive tool tooth having a smaller root thickness and a larger tooth height than the preceding tooth, the tool tooth at said opposite end of the rack intended for last engagement with the workpiece having the smallest root thickness and the largest tooth height.

2. An infeed rack cutter according to claim 1, wherein the lines of symmetry of the tool teeth are orientated substantially relative to a position which will be the center of the workpiece to be machined.

* * * * *